United States Patent
Yokota et al.

(10) Patent No.: US 11,100,653 B2
(45) Date of Patent: Aug. 24, 2021

(54) IMAGE RECOGNITION APPARATUS

(71) Applicants: TOYOTA JIDOSHA KABUSHIKI KAISHA, Toyota (JP); DENSO CORPORATION, Kariya (JP)

(72) Inventors: Masataka Yokota, Edogawa-ku (JP); Jia Sun, Shinagawa-ku (JP); Takahiro Sota, Yokohama (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 29 days.

(21) Appl. No.: 16/514,338

(22) Filed: Jul. 17, 2019

(65) Prior Publication Data

US 2020/0027217 A1 Jan. 23, 2020

(30) Foreign Application Priority Data

Jul. 18, 2018 (JP) .............................. JP2018-135068

(51) Int. Cl.
*G06T 7/00* (2017.01)
*G06T 7/246* (2017.01)
*G06K 9/00* (2006.01)

(52) U.S. Cl.
CPC .......... *G06T 7/248* (2017.01); *G06K 9/00805* (2013.01); *G06T 2207/20021* (2013.01); *G06T 2207/30261* (2013.01)

(58) Field of Classification Search
CPC ............. G06K 9/00805; G06T 7/248; G06T 2207/20021; G06T 2207/30261; G08B 13/19608
See application file for complete search history.

(56) References Cited

U.S. PATENT DOCUMENTS

| | | | | |
|---|---|---|---|---|
| 2014/0169695 A1* | 6/2014 | Lin | ..................... | G06K 9/00791 382/275 |
| 2015/0213592 A1* | 7/2015 | Mochizuki | ......... | G02B 27/0179 345/632 |
| 2018/0285648 A1* | 10/2018 | Pan | ..................... | G06K 9/00744 |
| 2018/0285656 A1* | 10/2018 | Yano | ..................... | G06K 9/00335 |
| 2018/0293450 A1* | 10/2018 | Soga | ......................... | G06T 7/80 |

FOREIGN PATENT DOCUMENTS

| | | | | |
|---|---|---|---|---|
| JP | 2009-71539 A | | 4/2009 | |
| JP | 2009248721 A | * | 10/2009 | ............. B60R 21/00 |

* cited by examiner

*Primary Examiner* — Thienvu V Tran
*Assistant Examiner* — Sreeya Sreevatsa
(74) *Attorney, Agent, or Firm* — Sughrue Mion, PLLC

(57) ABSTRACT

An image recognition apparatus is provided with: a divider configured to divide a frame image into a plurality of areas, wherein the frame image is obtained by imaging or capturing a scene outside through a window glass on which a wiper is mounted, from an interior of a moving body; a determinator configured to determine whether or not at least one of the wiper and an attached substance to the window glass appears, for each of the plurality of areas; an object detector configured to detect an object included in such an area of the plurality of areas that it is determined that the wiper and the attached substance do not appear; and a tracking device configured to track a tracking target, which is an object included in two or more frame images, on the basis of a detection result of the object detector.

5 Claims, 4 Drawing Sheets

TIME POINT t = T₂

WIPER BLADE   ESTIMATED EXISTENCE AREA OF OBJECT

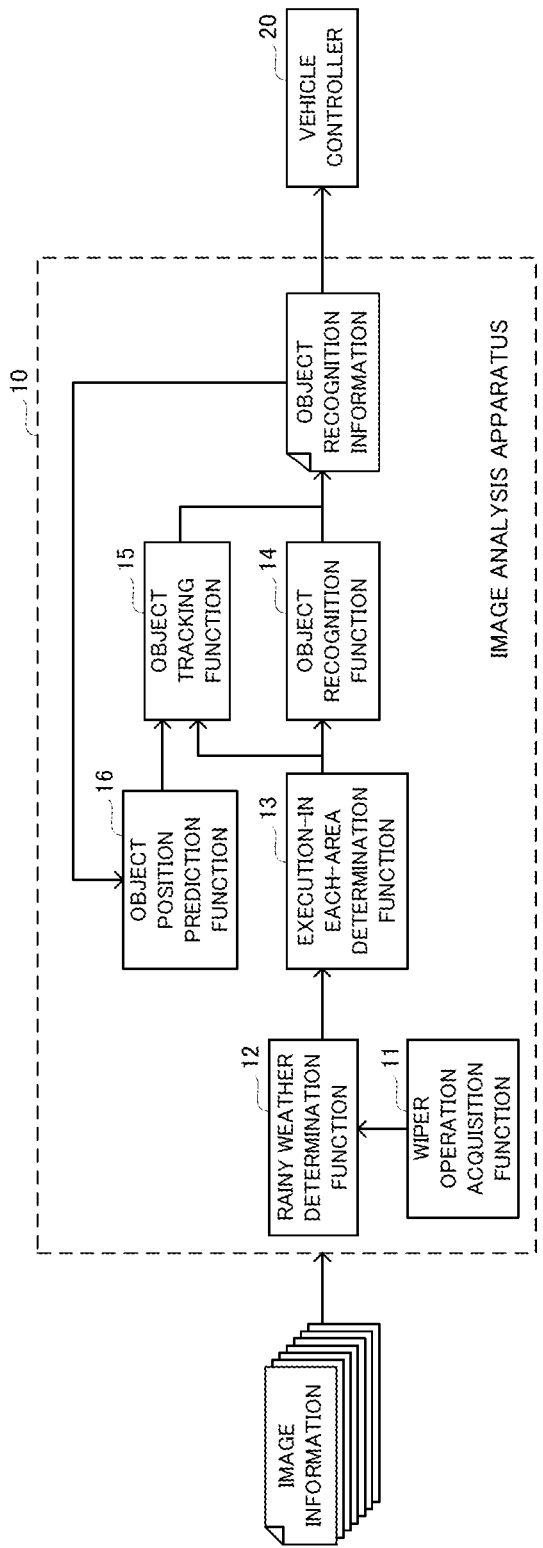

TIME POINT t = T₁

TIME POINT t = T₂

IMAGE RECOGNITION APPARATUS

CROSS-REFERENCE TO RELATED APPLICATIONS

This application is based upon and claims the benefit of priority of the prior Japanese Patent Application No. 2018-135068, filed on Jul. 18, 2018, the entire contents of which are incorporated herein by reference.

BACKGROUND OF THE INVENTION

1. Field of the Invention

Embodiments of the present invention relate to an image recognition apparatus.

2. Description of the Related Art

For this type of apparatus, for example, there is proposed an imaging apparatus for a vehicle, which is configured to specify a target candidate as a target if the target candidate is detected continuously the reference number of times or more in a captured image and which is configured to obtain only a captured image in which a wiper does not appear if the wiper is operating (refer to Japanese Patent Application Laid Open No. 2009-071539 (Patent Literature 1)).

The technology/technique disclosed in the Patent Literature 1 has such a technical problem that a frame rate is significantly reduced if the wiper is operating (mainly in a rainy weather).

SUMMARY

In view of the aforementioned problem, it is therefore an object of embodiments of the present disclosure to provide an image recognition apparatus that can prevent the frame rate from being reduced even in operation of the wiper.

The above object of embodiments of the present disclosure can be achieved by an image recognition apparatus including: an acquirer configured to obtain a plurality of frame images, which are temporally continuous and which are imaged or captured by an imaging apparatus for imaging or capturing a scene outside a moving body through a window glass on which a wiper is mounted, from an interior of the moving body; an object detector configured to detect an object included in each of the plurality of frame images; and a tracking device configured to track a tracking target, which is an object included in two or more of the plurality of frame images, on the basis of a detection result of the object detector, the image recognition apparatus provided with: a divider configured to divide one of the plurality of frame images into a plurality of areas; and a determinator configured to determine whether or not at least one of the wiper and an attached substance to the window glass appears, for each of the plurality of areas, wherein the object detector is configured to detect an object included in such an area of the plurality of areas that it is determined that the wiper and the attached substance do not appear, and the tracking device is configured to track the tracking target on the basis of the detection result of the object detector regarding another frame image that is temporally before the one frame image, for each of the plurality of areas.

BRIEF DESCRIPTION OF THE DRAWINGS

FIG. 1 is a block diagram illustrating a configuration of an image analysis apparatus according to an embodiment;

DETAILED DESCRIPTION OF THE EMBODIMENT

Figure 2A:
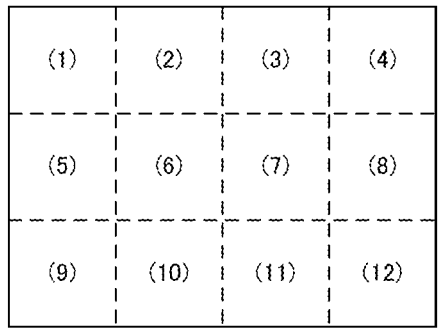
FIG. 2A is a diagram illustrating an example of an image.
Figure 2B:
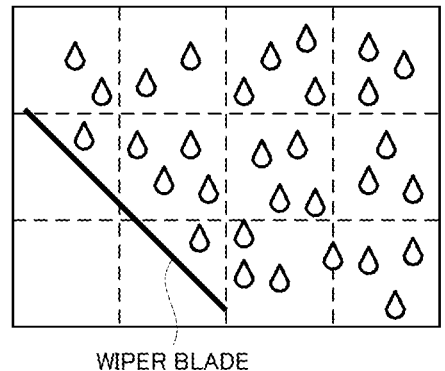
FIG. 2B is a diagram illustrating an example of the image.
Figure 2C:
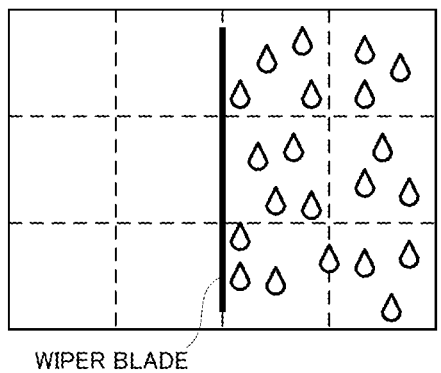
FIG. 2C is a diagram illustrating an example of the image.
Figure 2D:
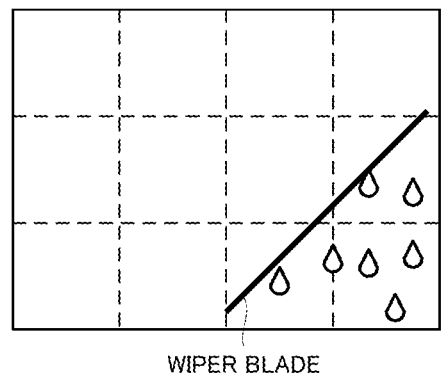
FIG. 2D is a diagram illustrating an example of the image.

An image recognition apparatus according to an embodiment will be explained with reference to FIG. 1 to FIG. 4. In the embodiment below, an image analysis apparatus is exemplified as the image recognition apparatus.

(Configuration)

A configuration of the image analysis apparatus according to the embodiment will be explained with reference to FIG. 1. FIG. 1 is a block diagram illustrating the configuration of the image analysis apparatus according to the embodiment.

In FIG. 1, an image analysis apparatus 10 is mounted on a vehicle 1. The vehicle 1 is provided with a not-illustrated camera configured to image or capture a scene outside the vehicle 1, through a window glass on which a wiper is mounted, from an interior of the vehicle 1. Here, if the vehicle 1 is an automobile (e.g., a four-wheel automobile), the window glass is not limited to a front window of the automobile, but may be, for example, a rear window or the like.

The image analysis apparatus 10 is provided with a wiper operation acquisition function device 11, a rainy weather determination function device 12, an execution-in-each-area determination function device 13, an object recognition function device 14, an object tracking function device 15, and an object position prediction function device 16, as processing blocks logically realized therein, or as processing circuits physically realized therein. In operation of the image analysis apparatus 10, a plurality of frame images (corresponding to "IMAGE INFORMATION" in FIG. 1), which are temporally continuous and which are captured or imaged by the camera, may be successively inputted to the image analysis apparatus 10.

The wiper operation acquisition function device 11 is configured to obtain information associated with a state of the wiper (e.g., ON/OFF, a low-speed continuous operation, a high-speed continuous operation, an intermittent operation, an interval of the intermittent operation, etc.). The "information associated with the state of the wiper" will be hereinafter referred to as "wiper information" as occasion demands.

The rainy weather determination function device 12 is configured to determine whether or not it is a rainy weather, on the basis of at least one of the wiper information and the frame images. Specifically, the rainy weather determination function device 12 may determine that it is the rainy weather if the wiper information indicates that the wiper is operating. The rainy weather determination function device 12 may extract an area in which there is an outline (e.g., a circular or round shape) corresponding to a rain drop, from the frame image. If a ratio of the extracted area to the frame image is greater than or equal to a predetermined value, the rainy weather determination function device 12 may determine that it is the rainy weather. Alternatively, the rainy weather determination function device 12 may comprehensively determine whether or not it is a rainy weather, in view of both the state of the wiper indicated by the wiper information and the area in which there is the outline corresponding to the rain drop and which is extracted from the frame image. The method of determining the rainy weather described herein is merely an example, and limitation is not made thereto.

The execution-in-each-area determination function device 13 is configured to divide the frame image into a plurality of areas if it is determined by the rainy weather determination function device 12 that it is the rainy weather. Specifically, the execution-in-each-area determination function device 13 may divide the frame image, for example, into 12 areas, as illustrated in FIG. 2A.

The execution-in-each-area determination function device 13 may then determine whether or not the wiper and an attached substance (e.g., a rain drop, a splash of mud, etc.) to the window glass appear, for each divided area. For example, in the case of a frame image illustrated in FIG. 2B, the execution-in-each-area determination function device 13 determines that there is the appearance in areas other than an area (9) (refer to FIG. 2A). For example, in the case of a frame image illustrated in FIG. 2C, the execution-in-each-area determination function device 13 determines that there is the appearance areas (3), (4), (7), (8), (11) and (12) (refer to FIG. 2A). For example, in the case of a frame image illustrated in FIG. 2D, the execution-in-each-area determination function device 13 determines that there is the appearance areas (7), (8), (11) and (12) (refer to FIG. 2A).

The execution-in-each-area determination function device 13 may, for example, extract a part with relatively low brightness in each area, and may determine that the wiper appears if a size of the extracted part is greater than or equal to a first predetermined size. The execution-in-each-area determination function device 13 may determine that the attached substance to the window glass appears, for example, if there is a circular or round outline whose size is greater than or equal to a second predetermined size. The method of determining the wiper or the attached substance described herein is merely an example, and limitation is not made thereto.

Figure 2E:
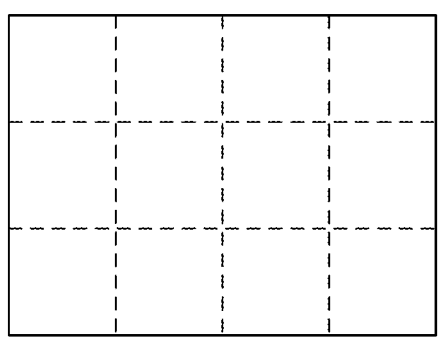
FIG. 2E is a diagram illustrating an example of the image.
Figure 3A:
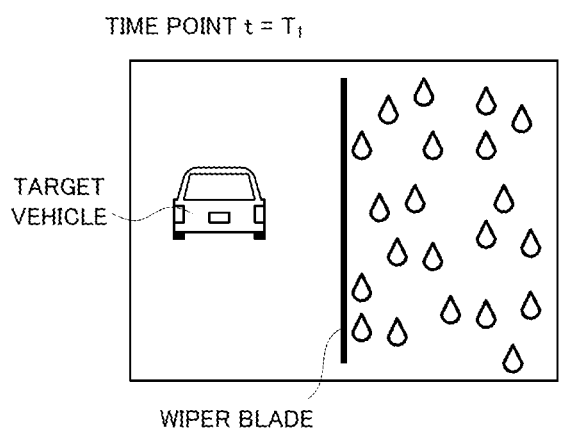
FIG. 3A is a diagram illustrating an example of a tracking process.
Figure 3B:
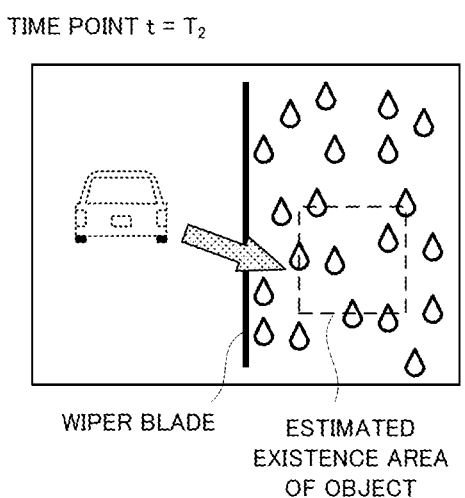
FIG. 3B is a diagram illustrating an example of the tracking process.

If it is determined by the rainy weather determination function device 12 that it is not the rainy weather, the execution-in-each-area determination function device 13 may not perform the aforementioned division and appearance determination, on the frame image (e.g., a frame image in which the wiper and the attached substance do not appear, as illustrated in FIG. 2E).

The object recognition function device 14 is configured to perform an object recognition process on the frame image, and is configured to recognize (or detect) an object(s) included in the frame image. The object recognition function device 14 may perform the object recognition process targeting at the entire frame image if it is determined by the rainy weather determination function device 12 that it is not the rainy weather. On the other hand, if it is determined by the rainy weather determination function device 12 that it is the rainy weather, the object recognition function device 14 may perform the object recognition process targeting at such an area of the frame image that it is determined by the execution-in-each-area determination function device 13 that the wiper and the attached substance do not appear. If it is determined by the rainy weather determination function device 12 that it is the rainy weather, the object recognition function device 14 may not perform the object recognition process on such an area of the frame image that it is determined by the execution-in-each-area determination function device 13 that at least one of the wiper and the attached substance appears. This is to prevent erroneous recognition. Information indicating the objects recognized by the object recognition function device 14 constitutes a part of object recognition information (refer to FIG. 1). A detailed explanation of the object recognition process will be omitted because various existing aspects can be applied.

The object tracking function device 15 is configured to track or chase a tracking target, such as, for example, a vehicle, out of the objects included in the frame image, in two or more frame images that are temporally continuous. Information associated with the tracking target tracked by the object tracking function device 15 constitutes another part of the object recognition information (refer to FIG. 1). A detailed explanation of a method of tracking the tracking target will be omitted because various existing aspects can be applied.

The object position prediction function device 16 is configured to predict a position (i.e., coordinates or a coordinate range on the frame image) of the tracking target, for a time point of imaging or capturing the frame image that is a present analysis target of the image analysis apparatus 10, on the basis of the past object recognition information, so as to assist the tracking of the tracking object by the object tracking function device 15. The object position prediction function device 16 is configured to output range information indicating a predetermined range including the predicted position, to the object tracking function device 15.

The prediction of a present position of the tracking target may be performed on the basis of a movement amount and a moving direction of the tracking target, which are detected, for example, from the past plurality of object recognition information. To what extent the past object recognition information, which is used to predict the position of the tracking target, goes back from the present object recognition information, i.e., how distant the "past" is from the "present", may be set, as occasion demands, for example, on the basis of an operating speed of the wiper, a frame rate, the moving speed of the tracking target, or the like.

In the embodiment, even if it is determined by the rainy weather determination function device 12 that it is the rainy weather, the object tracking function device 15 is configured to track the tracking target, with the entire frame image targeted (i.e., not only for such an area that it is determined by the execution-in-each-area determination function device 13 that the wiper and the attached substance do not appear, but also for such an area that at least one of the wiper and the attached substance appears by the execution-in-each-area determination function device 13).

At this time, if the tracking of the tracking target is performed without taking any measures for such an area of the frame image that it is determined by the execution-in-each-area determination function device 13 that at least one of the wiper and the attached substance appears, this may lead to an erroneous tracking result.

Therefore, in the embodiment, the object tracking function device 15 is configured to track the tracking target in the predetermined range indicated by the range information, which is outputted from the object position prediction function device 16. Specifically, for example, if a target vehicle is recognized as the tracking target from a frame image illustrated in FIG. 3A, which is imaged or captured at a time point T1, then, the object position prediction function device 16 may estimate a position of the target vehicle for a time point T2, i.e., for a time point of imaging or capturing the frame image that is the present analysis target of the image analysis apparatus 10. The object tracking function device 15 may track the tracking vehicle within the predetermined range indicated by the range information (refer to "ESTIMATED EXISTENCE AREA OF OBJECT" in FIG. 3B), which is outputted from the object position prediction function device 16, out of a frame image illustrated in FIG. 3B imaged or captured at the time point T2.

The vehicle 1 is further provided with a vehicle controller 20. The vehicle controller 20 is programmed or configured to control the vehicle 1 on the basis of the object recognition information generated by the image analysis apparatus 10. So as to avoid a collision with the vehicle 1 and an object that likely collides with the vehicle 1 out of the objects indicated by the object recognition information, for example, the vehicle controller 20 may control a brake actuator or the like, or may inform a driver of the vehicle 1 of a collision possibility or the presence of the object, on the basis of the object recognition information.

(Image Analysis Process)

Next, an image analysis process performed by the image analysis apparatus 10 as configured above will be explained with reference to a flowchart in FIG. 4.

Figure 4:
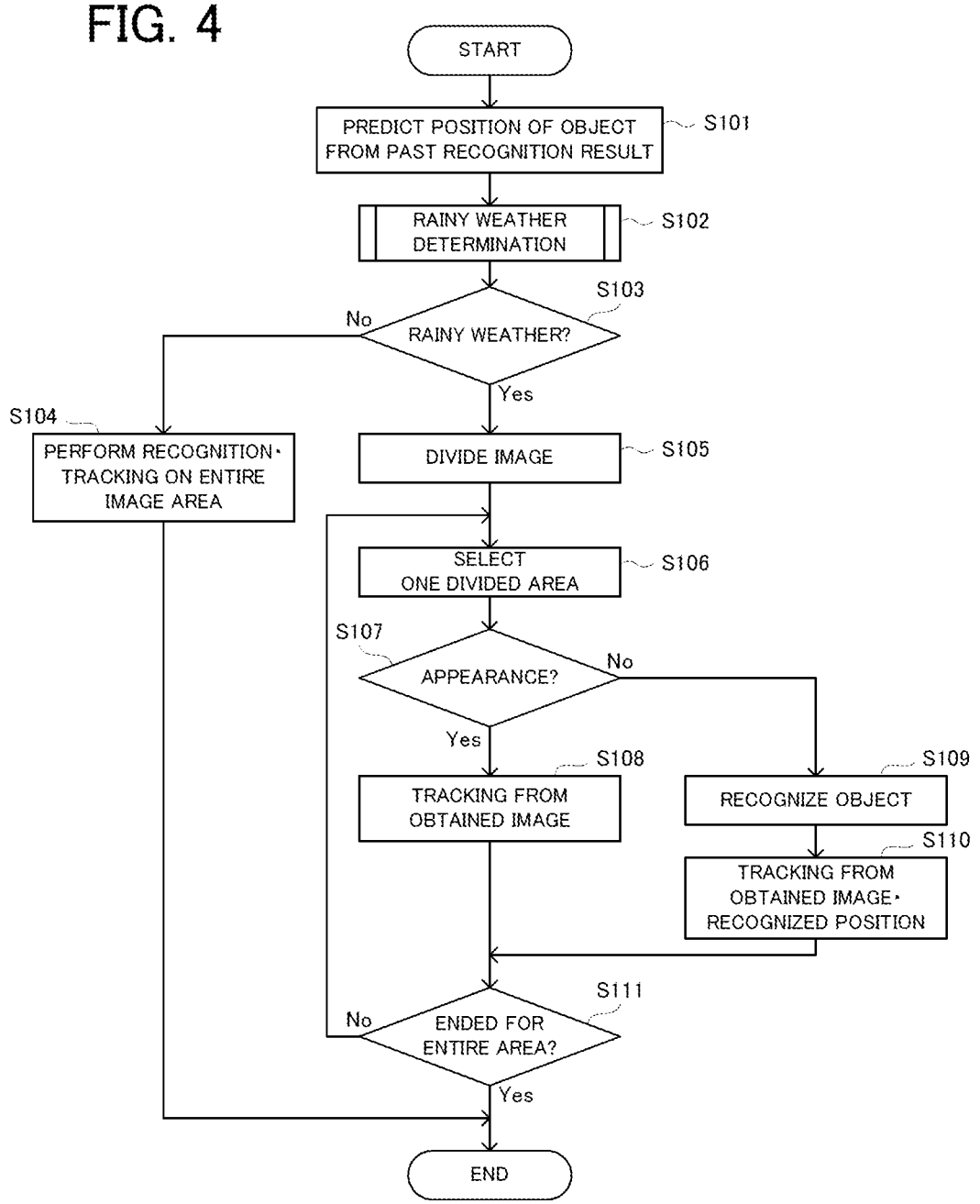
FIG. 4 is a flowchart illustrating an image analysis process according to the embodiment.

In FIG. 4, the object position prediction function device 16 predicts the position of the tracking target for the time point of imaging or capturing the frame image that is the present analysis target of the image analysis apparatus 10, from the past object recognition information (i.e., recognition result), and outputs the range information (step S101). In parallel with the step S101, the rainy weather determination function device 12 performs rainy weather determination (step S102).

The execution-in-each-area determination function device 13 then determines whether or not a result of the rainy weather determination performed by the rainy weather determination function device 12 shows the rainy weather (step S103). In the step S103, if it is determined that it is not the rainy weather (the step S103: No), the object recognition function device 14 performs the object recognition process targeting at the entire frame image, and the object tracking function device 15 tracks the tracking target on the basis of the range information outputted from the object position prediction function device 16 (step S104). In this case, the execution-in-each-area determination function device 13 does not divide the frame image.

After a lapse of a predetermined time (e.g., several ten milliseconds to several hundred milliseconds) from the end of the step S104, the step S101 is performed. In other words, a series of the steps illustrated in FIG. 4 is repeated with a period corresponding to the predetermined time.

In the step S103, if it is determined that it is the rainy weather (the step S103: Yes), the execution-in-each-area determination function device 13 divides the frame image into a plurality of areas (step S105). The execution-in-each-area determination function device 13 then selects an area from the plurality of areas (step S106). The execution-in-each-area determination function device 13 then determines whether or not at least one of the wiper and the attached substance to the window glass appears in the selected area (step S107).

In the step S107, if it is determined that at least one of the wiper and the attached substance appears (the step S107: Yes), the object tracking function device 15 tracks the tracking target on the basis of the range information outputted from the object position prediction function device 16 (step S108). In this case, the object recognition process targeting at the selected area is not performed.

On the other hand, in the step S107, if it is determined that the wiper and the attached substance do not appear (the step S107: No), the object recognition function device 14 performs the object recognition process targeting at the selected area (step S109), and the object tracking function device 15 tracks the tracking target on the basis of the range information outputted from the object position prediction function device 16 (step S110).

The execution-in-each-area determination function device 13 then determines whether or not the process, i.e., the steps S107 to S110, is performed for all the plurality of areas (step S111). In the step S111, if it is determined that the process is not performed for all the plurality of areas (the step S111: No), the step S106 is performed. On the other hand, in the step S111, if it is determined that the process is performed for all the plurality of areas (the step S111: Yes), the step S101 is performed after a lapse of the predetermined time.

(Technical Effect)

In the object recognition process performed by the object recognition function device 14, if the frame image in which the wiper and the attached substance to the window glass appear is used as it is, this likely reduces a recognition rate of the object possibly decreases and likely causes the erroneous recognition. On the other hand, if the frame image in which the wiper and the attached substance appear (e.g., refer to FIG. 2B to FIG. 2D) is removed from the targets of the object recognition process, the number of the frame images that can be used for the object recognition process may be remarkably reduced, and the frame rate associated with the object recognition may be also remarkably reduced.

On the image analysis apparatus 10, however, if it is determined that it is the rainy weather, the frame image is divided into a plurality of areas by the execution-in-each-area determination function device 13, and the object recognition process is performed for such an area that the wiper and the attached substance do not appear, out of the plurality of areas. Thus, even if the wiper and the attached substance appear in a part of the frame image, the object recognition process can be performed for another part of the frame image (i.e., the area in which the wiper and the attached substance do not appear) on the image analysis apparatus 10. Therefore, according to the image analysis apparatus 10, it is possible to prevent the frame rate of the frame images that are the targets of the object recognition process from being reduced even in the rainy weather, i.e., even in operation of the wiper.

In addition, on the image analysis apparatus 10, the tracking target is tracked or chased by the object tracking function device 15 on the basis of the range information outputted from the object position prediction function device 16. It is thus possible to prevent the erroneous tracking result even if the wiper and the attached substance appear in at least a part of the frame image.

Various aspects of embodiments of the present disclosure derived from the embodiment explained above will be explained hereinafter.

An image recognition apparatus according to an aspect of embodiments of the present disclosure is an image recognition apparatus including: an acquirer configured to obtain a plurality of frame images, which are temporally continuous and which are imaged or captured by an imaging apparatus for imaging or capturing a scene outside a moving body through a window glass on which a wiper is mounted, from an interior of the moving body; an object detector configured to detect an object included in each of the plurality of frame images; and a tracking device configured to track a tracking target, which is an object included in two or more of the plurality of frame images, on the basis of a detection result of the object detector, the image recognition apparatus provided with: a divider configured to divide one of the plurality of frame images into a plurality of areas; and a determinator configured to determine whether or not at least one of the wiper and an attached substance to the window glass appears, for each of the plurality of areas, wherein the object detector is configured to detect an object included in such an area of the plurality of areas that it is determined that the wiper and the attached substance do not appear, and the tracking device is configured to track the tracking target on the basis of the detection result of the object detector regarding another frame image that is temporally before the one frame image, for each of the plurality of areas.

In the aforementioned embodiment, the "rainy weather determination function device 12" corresponds to an example of the "acquirer". The "object recognition function device 14" corresponds to an example of the "object detector". The "object tracking function device 15" and the "object position prediction function device 16" correspond to an example of the "tracking device". The "execution-in-each-area determination function device 13" corresponds to an example of the "divider" and the "determinator".

On the image recognition apparatus, the object included in such an area of the frame image that it is determined that the wiper and the attached substance do not appear, is detected by the object detector. In other words, on the image recognition apparatus, even if at least one of the wiper and the attached substance appears in a part of the frame image, the object detection is performed for another part of the frame image. Therefore, according to the image recognition apparatus, it is possible to prevent a reduction in the number of frame images (i.e., a reduction in the frame rate) that are the targets of the object detection, out of the obtained plurality of frame images, even in operation of the wiper. The "moving body" conceptually includes not only the vehicle 1 (i.e., an automobile) in the aforementioned embodiment, but also a railway vehicle, an airplane, or the like.

In an aspect of the image recognition apparatus, the divider is configured to divide the one frame image into the plurality of areas on condition that it is a rainy weather. According to this aspect, if it is not the rainy weather, the frame image is not divided into the plurality of areas. It is thus possible to reduce a processing load of the image recognition apparatus.

In another aspect of the image recognition apparatus, the object detector is configured not to detect an object in such an area of the plurality of areas that it is determined that at least one of the wiper and the attached substance appears. According to this aspect, it is possible to reduce the processing load of the image recognition apparatus.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. An image recognition apparatus comprising:
an acquirer configured to obtain a plurality of frame images, which are temporally continuous and which are imaged or captured by an imaging apparatus for imaging or capturing a scene outside a moving body through a window glass on which a wiper is mounted, from an interior of the moving body;
an object detector configured to detect an object included in each of the plurality of frame images;
a tracking device configured to track a tracking target, which is an object included in two or more of the plurality of frame images, on the basis of a detection result of the object detector;
a divider configured to divide one of the plurality of frame images into a plurality of areas; and
a determinator configured to determine whether or not at least one of the wiper and an attached substance to the window glass appears, for each of the plurality of areas, wherein:
the object detector is configured to detect the object included in such an area of the plurality of areas that it is determined that the at least one of the wiper and the attached substance do not appear, and
the tracking device is configured to track the tracking target on the basis of the detection result of the object detector regarding another frame image that is temporally before the one frame image, for each of the plurality of areas,
wherein the object detector is configured to perform object detection using only areas, of the plurality of areas of the one image frame, in which it is determined that the wiper and the attached substance do not appear.

2. The image recognition apparatus according to claim 1, wherein said divider is configured to divide the one frame image into the plurality of areas on condition that it is a rainy weather.

3. The image recognition apparatus according to claim 1, wherein the object detector is configured not to detect the object in such an area of the plurality of areas that it is determined that at least one of the wiper and the attached substance appears.

4. The image recognition apparatus according to claim 2, wherein the object detector is configured not to detect the object in such an area of the plurality of areas that it is determined that at least one of the wiper and the attached substance appears.

5. An image recognition apparatus comprising one or more circuits configured to:
obtain a plurality of frame images, which are temporally continuous and which are imaged or captured by an imaging apparatus for imaging or capturing a scene outside a moving body through a window glass on which a wiper is mounted, from an interior of the moving body;
detect an object included in each of the plurality of frame images;
track a tracking target, which is an object included in two or more of the plurality of frame images, on the basis of a detection result;
divide one of the plurality of frame images into a plurality of areas; and
determine whether or not at least one of the wiper and an attached substance to the window glass appears, for each of the plurality of areas,
wherein the one or more circuits are configured to detect the object included in such an area of the plurality of areas that it is determined that the wiper and the attached substance do not appear, and
wherein the one or more circuits configured to track the tracking target on the basis of the detection result regarding another frame image that is temporally before the one frame image, for each of the plurality of areas, and wherein the circuitry is configured to perform object detection using only areas, of the plurality of areas of the one image frame, in which it is determined that the wiper and the attached substance do not appear.

\* \* \* \* \*